Patented Apr. 24, 1951

2,549,781

UNITED STATES PATENT OFFICE 2,549,781

CANNING METHOD FOR TOMATOES AND THE LIKE

William J. Emmons, Oakland, and Bernard S. Gallagher, Piedmont, Calif., assignors to Salter Machine Co., Oakland, Calif., a corporation of California No Drawing. Application July 23, 1945, Serial No. 606,714

7 Claims. (Cl. 99—186)

This application is a continuation-in-part of our application Ser. No. 541,098, filed June 19, 1944, entitled Canning Method for Tomatoes and the like, now abandoned.

Our invention relates to a process for the canning of fruits and vegetables, and particularly to an improved method for obtaining a firming thereof and for handling the firming agent in dry form.

An object of our invention is to provide a practical method for using calcium chloride in dry form in the process of canning foods.

Another object of our invention is to provide an improved commercial method of retaining uniform firmness of tomatoes throughout and following the canning process.

Another object of our invention is to provide an improved method for treating fruit with calcium salts and with table salt to obtain a uniform conditioning of the fruit.

In the canning of fruits and vegetables it has been known that certain calcium salts will firm up the article being canned. Adding calcium chloride (CaCl₂) for this purpose has become standard practice. Because it is held by some in the trade that calcium chloride imparts an objectionable flavor to tomatoes, many tomato canners, in addition to using calcium chloride, add sodium chloride (table salt) to restore a satisfactory flavor to the product. However, in connection with the use of table salt, the art teaches that the effect of table salt on solids in canning tomatoes is to soften and disintegrate the fruit and to reduce the drained weight of the contents. The following described method makes possible the use of calcium chloride to protect the firmness of the tomatoes and also the use of sodium chloride as a flavoring without the usual resulting loss of drained weight ordinarily caused by the softening effect of table salt.

Heretofore the calcium chloride has been added in two general ways:

Where added as a solution with the fruit juice the calcium salts do not give a uniform result because they are partially spent in reaction with the acids in the juice before they get to the fruit. Also it is difficult to maintain the solution at a uniform density. Furthermore there is no known method of accurately dispensing the proper quantity of the solution to the cans as they move along the automatic canning lines. Unavoidably, the product lacks uniformity under the prior practices.

Another important factor contributing to this lack of uniformity is the varying amounts of the solution added to the cans to fill them, depending upon the volume of the solid contents already in the can.

For example, in an extra standard pack of tomatoes which the canner decides should weigh about 30 ounces for a 2½ size can, the solids would weigh about 20 ounces going into the can. The other 10 ounces is the solution. The going-in weight will unavoidably vary over a range of an ounce or so each way, which means that the solution in the cans will vary several ounces. If there is too much solution, the Federal Food and Drug regulations are violated. If too little, the calcium is not sufficient to accomplish its firming effect. The product is not uniform. Also in the case of a solid pack, where no juice is usually added, a solution cannot be used to introduce the calcium.

The only other way heretofore developed for introducing the calcium was in tablet form, as is disclosed in such trade publications as "Canning Age" of February, 1942, page 91. The Martin Patent No. 2,333,873 points out the shortcomings of that method of introducing the calcium. The present invention overcomes all the shortcomings of the prior art.

Until the present invention the art had regarded the addition of the calcium chloride salt in dry form as being impossible. See for example "the Canner," vol. 90, No. 2, pages 12 and 13, of December 16, 1939; and the Martin patent.

Our invention has to do with the discovery of an improved method of introducing the calcium chloride (CaCl₂). By means of our method commercial canners have been able to raise their pack to a premium grade, while other of the same kind of fruit, packed simultaneously by older methods, was not so raised. We shall discuss our invention in connection with tomatoes, for purposes of illustrating its application to fruits and vegetables, as required by Revised Statutes, section 4888. It is understood, however, that variations in the showing made by the said description may be adopted within the scope of the invention as set forth in the claims.

Broadly our invention covers the process for dispensing calcium chloride in dry form in a cannery packing line or other location where atmospheric conditions are such as have heretofore made the use of calcium chloride in dry form seem impossible.

In a packing plant using, for example, an exhaust box, sealer, cooker and cooler we may obtain the advantages of our new method either by first putting the tomatoes in the can, then adding a measured amount of the calcium chloride as a dry solid in subdivided or tablet form so that it can be dropped onto the material in the can, or the calcium chloride may be dropped into the can before the tomatoes are put in. Calcium chloride, as is well known, is extremely hygroscopic, and if left exposed to the ordinary atmosphere, it quickly takes up moisture from the atmosphere and dissolves in the water so taken up; and this is particularly true in the humid atmosphere prevailing in canneries. Not only does the dry calcium chloride attract moisture to itself but it causes the moisture in the atmosphere to be attracted to the surfaces of the dispensing machine thereby preventing the proper flow of material through the ducts provided for that purpose. The present invention makes possible the use of dry calcium chloride in the cannery, by maintaining it dry until it is to be used. We keep it dry by protecting it from atmospheric moisture.

In a modern cannery, the processing steps are continuous and automatic. The problem, therefore, has been not only that of maintaining the dry calcium chloride dry, but involved, in addition, the problem of automatically feeding it in measured amounts into the cans. With this in view, we prefer to store the dry calcium chloride in subdivided form in a dispenser, housed within a chamber, from which it can be served as required, with an atmosphere prevailing within the dispenser and chamber which has a relative humidity low enough to keep it dry. The preferred way of producing the desired result is to have a sufficiently dry atmosphere within the dispenser and the chamber, whether such atmosphere be air or other gas. For example, any suitable method of heating may be used, to produce a dry atmosphere within the dispenser and chamber. Perhaps the simplest is an electric heating element. All that is needed is to have the relative degree of humidity not higher than the maximum effective for the purpose, and it is preferably lower than such maximum as a factor of safety. A mean temperature of the air within the container as high as 130° F. to 140° F. is effective under ordinary cannery conditions of operation. This temperature range is merely an example and may vary with different locations.

A dispenser and chamber mechanism of suitable type can be provided to feed pre-determined, measured amounts of the dry calcium chloride from an outlet in the chamber into the cans, jars, or the like, when it is desired that such operation be automatic.

The original container in which calcium chloride is shipped and/or stored, or any suitable bottle or airtight container, will, when properly sealed or stoppered, maintain the calcium chloride dry by protecting it from extended contact with the atmosphere.

After we add the dry calcium chloride to the tomatoes in the can, we may proceed by passing the tomatoes through the exhauster, then adding sodium chloride (NaCl), closing the can, and then passing it through the cooker and the cooler. The sodium chloride is useful as flavoring and serves to overcome the bitter or foreign flavor imparted by the calcium chloride, which was introduced to keep the tomatoes from breaking up during the cooking operation. Although theoretically the sodium chloride counteracts the calcium chloride and would be expected with the heat of cooking to break down the fruit, we have discovered that by having added the calcium chloride dry and in a uniformly measured amount before the table salt (NaCl), that the calcium chloride has had a maximum reaction with the acid present in the fruit so it supports the cell structure during the heating and cooking steps and produces a canned product with a very firm characteristic. With the calcium salt put in the can ahead of the table salt, the destructive effect of the latter on the cell structure is nullified and a product is obtained with a maximum amount of the fruit in solid form rather than as juice or small particles.

Since the calcium chloride ($CaCl_2$) is added in dry form, this enables an accurate control of the amount put in each can. We have discovered that when the calcium salt is dissolved in the juice and added as a solution, the salt is partially spent by reaction with the juice. The older the solution, the less effective will be the reaction of the calcium salt on the fruit cell structure; therefore, there can be no uniformity of result. Furthermore, there is the difficulty of measuring accurately the amount of calcium solution introduced into each can as it speeds down the line. By accurately measuring the dry calcium salt and introducing it into the can in dry form a uniform reaction is assured. The quantity of sodium chloride added later will vary with the quality of the particular fruit, but a good general ratio is about four times the amount of calcium chloride. The table salt also is best introduced in dry form in carefully measured amounts.

The time interval between adding the dry calcium salt and the dry sodium chloride will depend on several factors: for example, it should be long enough for the calcium chloride to act on the fruit to get the firming and the cell structure fortified before the sodium chloride reaches it. The calcium chloride is very quick to dissolve and it will spread throughout the fruit very quickly particularly if the fruit is warmed as in the exhauster. It is desirable to get the calcium chloride spread throughout the fruit cells before the sodium chloride appears.

To accentuate the delay it may in some cases be advisable to encase the measured amount of table salt (NaCl) in a capsule or coating which will not dissolve immediately upon its introduction into the can. Preferably this capsule is one which requires heat to melt it before it can release the salt.

Our invention has application as well to the more recent method of canning where the exhausting step is dispensed with and a vacuum pack is used. In this modification it is important in carrying out our discovery that the sodium chloride and the calcium chloride be added separately in dry measured amounts. If no capsule is used for the sodium chloride then we preferably deposit it in the opposite end of the can from the calcium salt. Thus, the dry NaCl may be put in the can, then the fruit, then the dry $CaCl_2$ on top of the fruit. The dry $CaCl_2$, being separated from the NaCl, has a chance to go to work out of the presence of the NaCl and quickly dissolves and spreads throughout the bulk of the fruit, firming it up before the NaCl can get at it. It is optional which salt is put in the bottom of the can, although we have found quicker spreading results from putting the $CaCl_2$ on top.

Our invention is also applicable to the vacuum "standard pack," that is, a pack in which juice of the fruit is added. In this case, the dry $CaCl_2$ in a measured amount is introduced into the can, then there is a time interval before the NaCl is introduced or a capsule may be used followed by vacuum sealing of the can, then cooking and cooling. The capsule dissolves in the cooking operation, releasing the NaCl.

Where the vacuum solid pack is used, that is, a pack in which there is no juice added and no exhausting operation, we prefer to sprinkle or drop the dry calcium chloride on the fruit after it is in the can, then have a time interval for it to dissolve and spread throughout the fruit to firm up the tissue before the dry sodium chloride is added and the can sealed in a vacuum sealer or other closing machine. Here again the time interval may be obtained by use of a capsule for the NaCl.

It is to be particularly noted that the process herein described for obtaining uniformity and for improving the percentage of soilds in the canned product has proven positive and universally dependable. And it will be further noted that while the application of the process as herein more specifically set forth is that which has been used in the canning of tomatoes, the same may be effectively applied to the preparation of other fruits and vegetables which tend to disintergrate during canning.

An additional benefit made possible by the invention has to do with the matter of flavoring the tomatoes.

As used in the claims the word "can" is understood to mean any container, whether made of metal, wood, glass, paper, plastic or synthetic material.

As used in the claims the words "calcium salt" are understood to mean any calcium salt in a form suitable for accurate dispensing in measured amounts and which acts to firm the fruit or vegetable cell structure.

As used in the claims the words "sodium chloride" are understood to mean any flavoring medium which is suitable to overcome the flavor imparted by the calcium salt. It may or may not be NaCl.

We claim:

1. In a process for canning fruits and vegetables the steps of placing a charge of sodium chloride in the can, filling the can with material chosen from the class consisting of fruits and vegetables, dumping on top of said material a measured charge of dry calcium chloride, closing said can, and subjecting its contents to a cooking temperature.

2. In a process for canning fruits and vegetables the steps of placing a measured charge of dry calcium chloride in the can, filling the can with material chosen from the class consisting of fruits and vegetables, dumping on top of said material a measured charge of sodium chloride, closing said can, and subjecting its contents to a cooking temperature.

3. A process for obtaining firm and seasoned canned fruits and vegetables which incorporates into the normal canning operation the steps of adding dry granular calcium chloride to the material being canned before said material is seasoned or cooked, waiting for a time interval to elapse, adding sodium chloride thereto, and then cooking said material.

4. In a process for canning vegetables and fruits, the steps of subjecting uncooked material chosen from the class consisting of fruits and vegetables to the reaction of a measured charge of dry granular calcium chloride and, when said reaction has extended substantially throughout the bulk of said material, adding a measured charge of sodium chloride to season, and then cooking said material.

5. In the canning of tomatoes, the method of adding dry granular calcium chloride in predetermined amounts directly to containers filled with said tomatoes, which comprises passing said filled containers in a single file beneath a discharge opening at the bottom of a dispensing chamber, maintaining a dry atmosphere in said chamber, maintaining said calcium chloride in a hopper in said chamber measuring in said chamber a predetermined amount of said calcium chloride from said hopper, dropping said measured calcium chloride from said chamber through said discharge opening as each container passes directly below said opening, then dropping a charge of sodium chloride into said containers in such time relation to said calcium chloride that said calcium chloride reacts to harden said tomatoes before said sodium chloride reacts with said tomatoes, affixing lids to said containers, and then subjecting said containers to a cooking process.

6. A process for employing calcium chloride in firming canned fruits and vegetables which comprises the steps of stabilizing dry, granular calcium chloride within a chamber at the locus of use, maintaining within said chamber an arid atmosphere to prevent the transfer of water from the atmosphere surrounding said chamber to the solid contents housed therein, measuring a charge of said calcium chloride, dropping it directly from said arid atmosphere into the can containing the material being canned, adding to said can sodium chloride after said calcium chloride has reacted with said material to forestall and prevent softening, and then cooking said material.

7. In the canning of fruits and vegetables to be treated with calcium chloride and seasoned with sodium chloride, and process to increase the resistance of fruits and vegetables to the softening effects of sodium chloride and of heating, which consists of storing dry granular calcium chloride in a dispenser housed within a chamber, maintaining within said chamber an arid atmosphere, placing material chosen from the class of fruits and vegetables into a can which is to be sealed, dropping on to said material a measured amount of said calcium chloride through a discharge port at the bottom of said chamber which extends directly from the arid atmosphere within the said chamber to a point above the desired locus of disposition of said calcium chloride, waiting an interval of time, adding a measured charge of sodium chloride, and subsequently cooking said material.

WILLIAM J. EMMONS.
BERNARD S. GALLAGHER.

REFERENCES CITED

The following references are of record in the file of this patent:

UNITED STATES PATENTS

| Number | Name | Date |
| --- | --- | --- |
| 895,377 | Kunz | Aug. 4, 1908 |
| 1,887,073 | Suppiger | Nov. 8, 1932 |
| 1,998,179 | Wolf | Apr. 16, 1935 |
| 2,031,243 | Wolf | Feb. 18, 1936 |
| 2,186,003 | Blair | Jan. 9, 1940 |
| 2,214,419 | Jones | Sept. 10, 1940 |
| 2,326,276 | Avekidian | Aug. 10, 1943 |
| 2,333,873 | Martin | Nov. 9, 1943 |

OTHER REFERENCES

"Canning Age," Feb. 1942, page 91. Calcium Firming of Canned Tomatoes. "The Canner," vol. 90, No. 2, pages 12–13, published Dec. 16, 1939. The Effect of Calcium Salts in Canning Tomatoes.